Sept. 14, 1965 D. W. MOORE 3,206,638

MEMORY FOR X-Y PLOTTER

Filed April 4, 1962 3 Sheets-Sheet 1

INVENTOR.
DAVID W. MOORE

BY

Richard P. Alberi
AGENT

Sept. 14, 1965 D. W. MOORE 3,206,638

MEMORY FOR X-Y PLOTTER

Filed April 4, 1962 3 Sheets-Sheet 2

INVENTOR.
DAVID W. MOORE
BY
Richard P. Alberi
AGENT

Sept. 14, 1965 D. W. MOORE 3,206,638

MEMORY FOR X-Y PLOTTER

Filed April 4, 1962 3 Sheets-Sheet 3

INVENTOR.
DAVID W. MOORE

BY

Richard P. Alberi
AGENT

United States Patent Office 3,206,638
Patented Sept. 14, 1965

3,206,638
MEMORY FOR X-Y PLOTTER

David W. Moore, Santa Barbara, Calif., assignor, by mesne assignments, to Lear Siegler, Inc., Santa Monica, Calif., a corporation of Delaware Filed Apr. 4, 1962, Ser. No. 185,071
5 Claims. (Cl. 315—161)

This invention relates to X-Y plotting devices and more particularly to a memory for an electronic X-Y plotting device.

In the present state of the art, X-Y plotting devices are known. Usually they consist of X (horizontal) electrodes and Y (vertical) electrodes positioned on either side of an illuminating apparatus. The illuminating apparatus may be electroluminescent phosphor, or it may be a gas cell whereby electron discharge illuminates the cell. Generally, either the X electrodes or the Y electrodes are positioned on a transparent plate so that the illumination may be viewed from outside the device. When one X electrode and one Y electrode is electrically connected to a power source, the cell, or a portion of electroluminescent material which is between the junction of that particular X and Y electrode, is subjected to an electrical potential which illuminates the cell. By choosing another X and another Y electrode, another cell may be illuminated.

It is also possible in the present state of the art to illuminate all of the cells. However, the electrodes are usually selected by a position switch which only contacts one of the Y and one of the X electrodes at a time. This means that when a second cell is desired to be illuminated, the first cell is disconnected from the power source, thereby causing the cell to be deenergized and not illuminated. It is desirable once a cell has been illuminated to have it remain illuminated while selecting other cells to be illuminated. This may be accomplished external to the device by a massive computer. In other words, the computer computes which electrodes in the X and Y planes are to remain connected to the potential to illuminate the new desired cell. Such a computer, however, entails a mass of circuitry and electronics which renders the X-Y plotter virtually impractical for most applications.

It is, therefore, an object of the present invention to provide an X-Y plotter with a built-in memory device.

It is another object of the invention to provide an X-Y plotter with a memory without the use of external complicated circuits.

It is another object of the present invention to provide an X-Y plotting device which has a built-in memory such that any position which is illuminated, automatically remains illuminated during the selection of other cells being selected for illumination.

According to the present invention an X-Y plotting device has a first plate having X electrodes thereon and a second plate having Y electrodes thereon. A third plate is positioned intermediate to first and second plates and has rows of holes in it. The rows of holes corresponding in the X and Y directions to the X and Y electrodes. A fourth plate is positioned between the first and third plates and has holes therein alignment with the holes in the third plate. A fifth plate is positioned between the second and third plates and has holes therein in alignment with the holes in the third and fourth plates, wereby a plurality of aligned series of holes are provided through the third, fourth and fifth plates. The plates are sealed together. A gas is inserted into the holes which illuminates when subjected to an electron discharge between the X and Y electrodes. A circuit is electrically connected to the third plate to provide a power sufficient to maintain the gas in at least one of the aligned series of holes illuminated after power had been applied to the X and Y electrodes sufficient to cause the gas in the aligned series of holes to be illuminated.

The objects and advantages of the present invention will become apparent from the following description when taken in conjunction with the drawings, in which.

Figure 1:
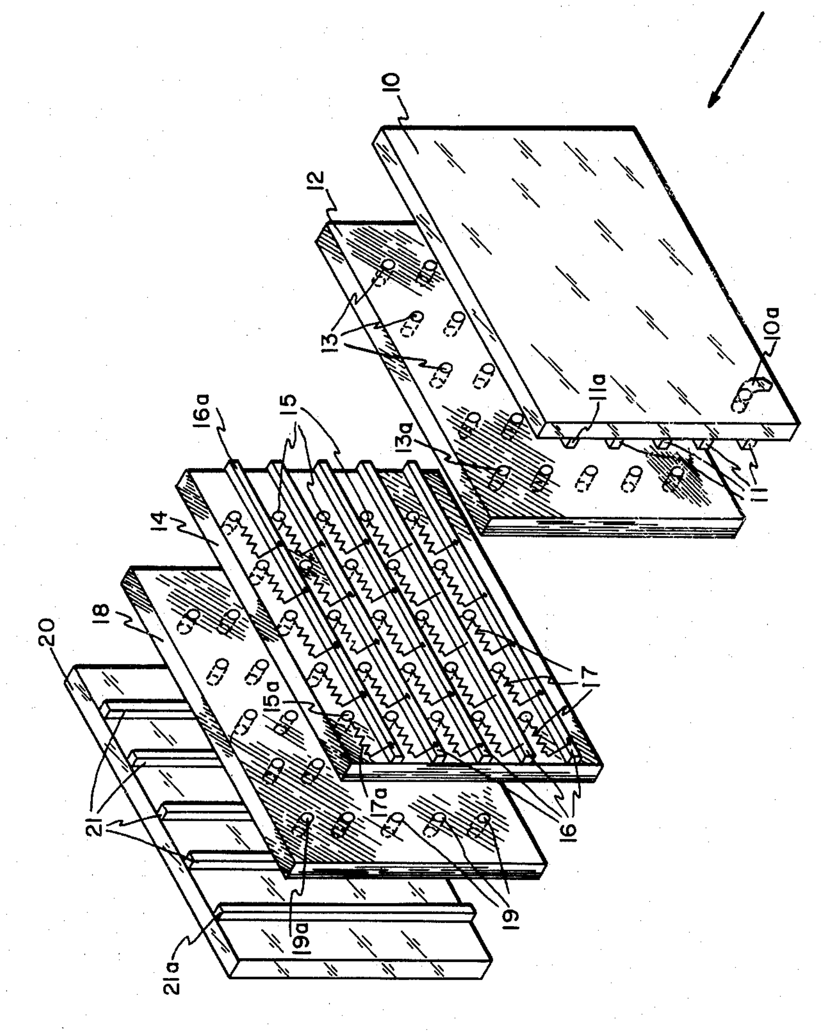
FIG. 1 is an exploded perspective view of the present invention.

Referring to FIG. 1, a transparent plate 10 has electrodes 11 on one side thereof. The number of electrodes shown are five, however, the number may be greater or less as desired. On the electrode side of plate 10 is an insert 12 having holes 13 therein. The horizontal alignment of the holes 13 coincides with the horizontal alignment of the electrodes 11. The number of horizontal lines of holes 13 also equals the number of horizontal electrodes 11. The holes are aligned in substantially evenly spaced rows which cross at right angles on the insert 12. Positioned on the side of insert 12, further removed from electrodes 11, is a second insert 14. The insert 14 has holes 15 in alignment with the holes 13, of insert 12. Also, on one face of insert 14 are electrodes 16. Electrodes 16 are not in alignment with the electrodes 11, and are displaced from the holes 15. Connected between each of the holes 15 and one of the electrodes 16 is a resistor 17. Although not shown in the drawing, the holes 15 are lined on the inside with a conductive material such as copper, silver, Nichrome, etc. The lining is accomplished by conventional plating, painting, spraying, vapor depositing, or the like.

It can be seen now that each of the electrodes 16 is electrically connected to such of the holes 15 which correspond to the line of holes above the electrode 16, by way of an individual resistor, the number of resistors corresponding to the number of such holes 15. On the side of the second insert 14, which is not facing the insert 12, is a third insert 18. The third insert 18 has holes 19 therein in alignment with the holes 13 and 15.

The transparent plate 10 is made of transparent material such as glass. The electrodes can be of any conductive material such as copper, nichrome, a plurality of layers of different material, etc., as more fully described in the co-pending application of the common assignee bearing Serial Number 185,015, filed April 4, 1962. The material used for the inserts 12, 14, and 18 may be for example, glass, Pyrex, or the like.

The resistors 17 on the second insert 14 can be of any conductive material such as Nichrome, etc., and can be silk screened, plated, or vapor deposited onto the insert 14, as is well known in the art.

On the side of the insert 18 which is not facing the insert 14, is the end plate 20, having vertical (x) electrodes 21. The electrodes 21 are in alignment with the vertical lines of the holes 13, 15, and 19. When the inserts plus the end plates are sandwiched together and sealed around the edges by techniques well known in the art and as described in the above mentioned co-pending application, a vacuum is drawn on the unit and a gas such as neon, kryton, argon, or the like, is introduced into the inside of the sandwich and into the holes 13, 15 and 19 by way of spout 10*a*.

Now, it can be seen that with the proper selection of an X and Y electrode, a given hole in the insert 12, for example, hole 13*a* and the corresponding holes in the inserts 14 and 18, e.g., holes 17*a* and 19*a*, respectively, will be illuminated due to the electron discharge from one electrode, for example, electrode 21a to the other electrode, for example electrode 11a.

It is to be noted that the electrodes 11, 16 and 21 are shown out of scale for purposes of illustration only.

A better understanding of the electrical circuit will be had from the following description.

Figure 2:
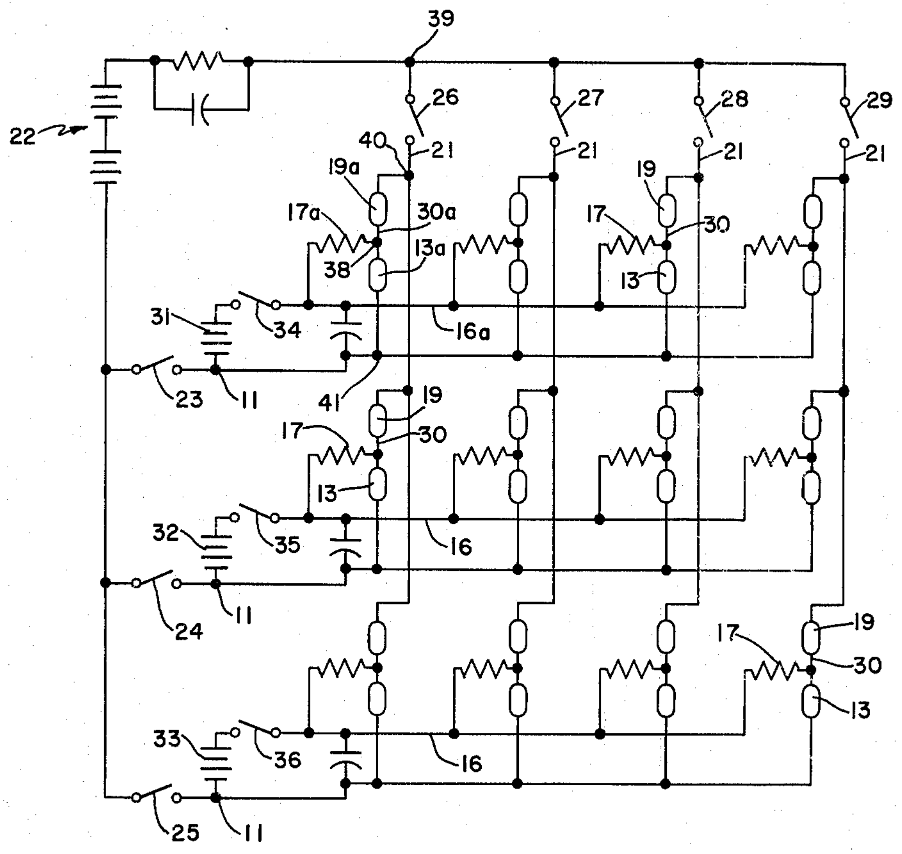
FIG. 2 is a schematic drawing of the present invention.

Referring to FIG. 2, a power supply 22 is electrically connected on one side to the electrodes 11 by way of switches 23, 24, and 25. Note that only three electrodes 11 are shown, but it is obvious that as many or as few as may be desired can be used.

The other side of the power supply 22 is connected to the electrodes 21 by way of switches 26, 27, 28, and 29. Again, only four electrodes 21 are shown in FIG. 2 but as many or as few as may be desired may be used.

A resistor-capacitor network is connected between the power supply 22 and the switches 26, 27, 28, and 29 to smooth out the direct current voltage. The electrodes 11 are shown connected to the holes or cells 13, as they would be in FIG. 1 when end plate 10 is positioned against the insert 12.

The electrodes 21 are shown in FIG. 2 as electrically connected to one side of the holes or cells 19. The electrical connections 30 between the cells 13 and 19 are the electrical connections due to the conductor on the inside of the holes 15 in the insert 14.

The horizontal electrodes 16 on insert 14, as shown in FIG. 2, are connected to the electrical connections 30 by way of resistors 17. The horizontal electrodes 16 are individually connected to individual power supplies 31, 32, and 33 by way of switches 34, 35, and 36, respectively. The power supplies 31, 32 and 33 provide the power for the memory and part of the firing power required while the power supply 22 provides the remainder of the firing power required to illuminate the cells or holes 13 and 19.

Figure 3:
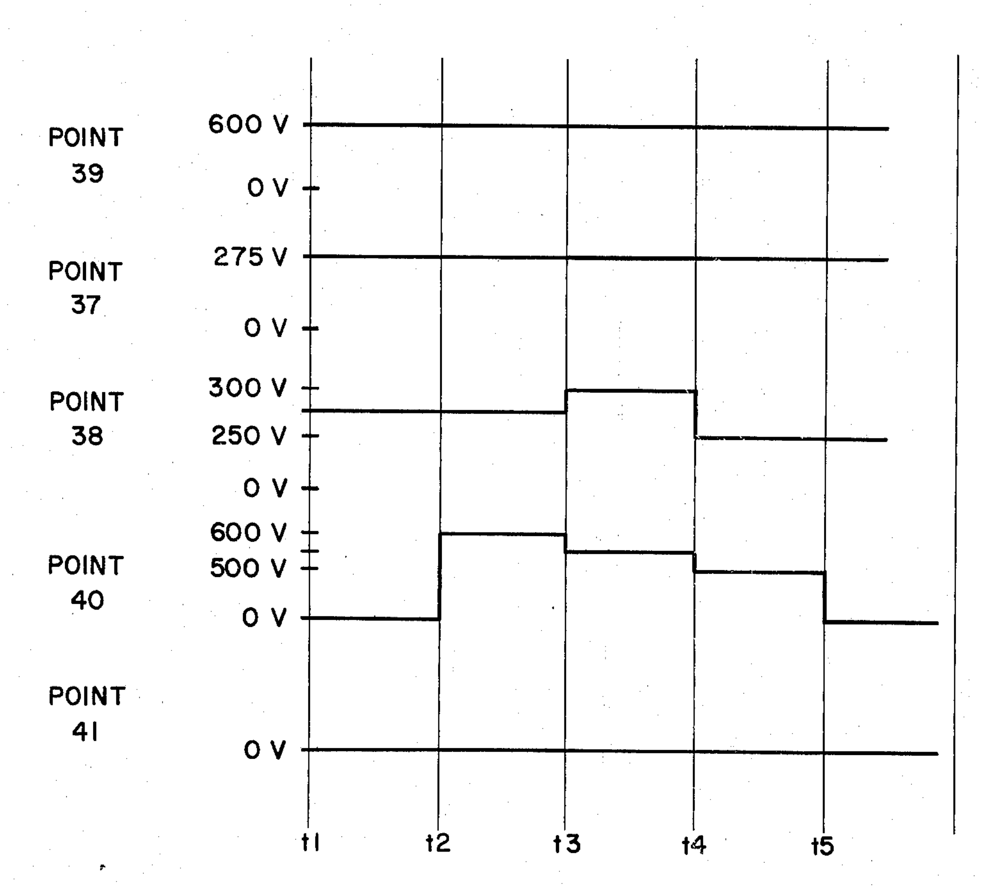
FIG. 3 is a wave-form diagram.

Referring now to both FIGS. 2 and 3, and using for an example a power supply 31 of 275 volts and the power supply 22 of 600 volts, we see that with switches 23, 24, and 26 open there is no electrical connection to the cells 13a and 19a. Now when switch 34 is closed, the 275 volts from the power supply 31 is applied to line 16a and also to point 37 which is on one side of resistor 17a. Since there is no conduction yet, the point 38 on the other side of resistor 17a is also at a 275 volt potential. Now, assuming that a firing voltage of 300 volts is required to illuminate the cells 13a and 19a, it can be seen that with only switch 34 closed, there is not enough voltage across cell 13a, or for that matter, across cell 19a, to fire or illuminate either one of the cells.

Next assume that switch 23 is closed, and switch 34 is also closed, therefore the voltage at point 39 is 600 volts. However, at point 40 the voltage is zero because switch 26 is open. The voltage at point 37 remains at 275 volts and it remains at 275 volts at point 38 also. The voltage at point 41 is zero with even switch 23 effectively closed because it is to the negative side of power supply 22. Next consider switch 26 closed. This would be comparable to $t_2$ on FIG. 3, at which time the voltage at point 39 remains at 600 volts, the voltage at point 37 remains 275, and the voltage at point 38 remains 275; however, now the voltage at point 40 is 600 volts but until the cells 19 and 13 illuminate, the voltage at point 41 is going to remain zero.

However, at $t_3$, the instant immediately after switch 26 is closed, cell 19a has applied across it 325 volts, which is sufficient to fire the cell or to cause electron discharge from one side to the other thereby illuminating itself, and now the potential voltage at point 38 increases to 300 volts and causes the cell 13a to illuminate (time, $t_4$) since there is a 300 volt differential between points 38 and 41. At this point both cells 13a and 19a are illuminated.

When, thereafter, switches 26 and 23 are opened there is (time, $t_5$), no electrical connection between the power supply 22 and the cells 13a and 19a. The only electrical connection is from the power supply 31 by way of the cell 13a. Consequently, the voltage at point 40 drops to zero and cell 19a ceases to be illuminated. But the voltage across the cell 13a between point 38 and 41 is at 250 volts due to a drop of 25 volts across resistor 17a. Such voltage is sufficient to hold the illumination of cell 13a. It should be noted that in firing gaseous cells, a higher voltage is required to fire the cells than to keep them illuminated. In this particular example, the firing voltage was 300 volts and the holding voltage was 250 volts.

Cell 13a remains illuminated until switch 34 is opened. Any of the other combination of X and Y electrodes may be selected through the switches to cause another cell to illuminate following the same procedure of operation as described for the cells 13a and 19a. It can be seen now with this circuit and construction shown on the drawings, an X-Y plotting device is made which provides for an inherent memory so that more than one cell may be illuminated and remain illuminated while other cells are being selected for illumination, without the use of extensive computing circuits and devices.

Such a device can display figures, letters, numbers, and can be used, for example, for a display board in a train station to display train schedules. Furthermore, the device may be used to display information required in aircraft instrument panels. Other uses and application for the device are readily apparent from the foregoing.

Although this invention has been particularly described above, it is not intended that it should be limited by the above description, but only in accordance with the spirit and scope of the appended claims.

What I claim:

1. An electronic display panel comprising:
   - a first plate having a first set of elongated electrodes located thereon,
   - a second plate superposed on said first plate and juxtaposed to said first set of electrodes, said second plate having a first set of holes therein arranged in rows and columns and wherein the electrodes in said first set of electrodes intersect said first set of holes by rows,
   - a third plate superposed on said second plate, said third plate having a second set of holes therein arranged in rows and columns and registering with the holes in said first set of holes in said second plate, the walls which define said holes containing a lining of an electrically conducting material,
   - said third plate having a second set of elongated electrodes located thereon and corresponding in number with the number of rows of holes in said third plate and wherein the individual electrodes of said second set of elongated electrodes are located in positions laterally displaced from individual rows of said last mentioned rows of holes and in parallel relationship to the electrodes in said first set of electrodes,
   - an individual resistor connecting the said lining in each hole in a row of holes in said second set of holes with one of the electrodes in said second set of electrodes, each of said electrodes in said second set of electrodes being connected to the holes of one row of holes linings in said second set of holes,
   - a fourth plate superposed on said third plate, said fourth plate having a third set of holes therein arranged in rows and columns and registering with the holes in said second set of holes, thereby forming a set of registering holes which pass through said second, third and fourth plates,
   - a fifth plate superposed on said fourth plate, said fifth plate having a third set of elongated electrodes located thereon, and juxtaposed to said fourth plate, and wherein the electrodes in said third set of electrodes intersect said third set of holes by columns, the longitudinal axis of said third set of electrodes being substantially perpendicular to the longitudinal axis of said first set of electrodes, the peripheral edge of said panel being sealed gas tight, and a gas in said holes.

2. The electronic display panel of claim 1 wherein said resistors are thin film resistors deposited on said third plate.

3. The electronic display panel of claim 1 and in addition a first power supply means connected between said first and said third sets of said elongated electrodes for initiating illumination of said gas in a selected one of said registering holes in said set of registering holes.

4. The electronic display panel of claim 3 and in addition a second power supply means connected between said first and said second sets of said elongated electrodes for sustaining illumination in a selected one of said registering holes in said set of registering holes.

5. The electronic display panel of claim 3 and in addition an individual power supply means connected between each pair of parallel electrodes of said first and said second sets of elongated electrodes for sustaining illumination in a selected one of said registering holes in said set of registering holes.

References Cited by the Examiner

UNITED STATES PATENTS

| | | | |
|---|---|---|---|
| 2,889,538 | 6/59 | Geisler | 315—169 |
| 3,042,823 | 7/62 | Willard | 315—169 |

DAVID J. GALVIN, *Primary Examiner.*